(12) United States Patent
Katayama et al.

(10) Patent No.: US 7,541,427 B2
(45) Date of Patent: Jun. 2, 2009

(54) METHOD FOR DESOLVATION OF POLYMER SOLUTION

(75) Inventors: Nobuaki Katayama, Tokyo (JP); Katsunori Ishii, Tokyo (JP); Naritsugu Kumai, Tokyo (JP)

(73) Assignees: JSR Corporation, Tokyo (JP); International Center for Environmental Technology Transfer, Yokkaichi-shi (JP)

( * ) Notice: Subject to any disclaimer, the term of this patent is extended or adjusted under 35 U.S.C. 154(b) by 245 days.

(21) Appl. No.: 10/563,584

(22) PCT Filed: Jun. 14, 2004

(86) PCT No.: PCT/JP2004/008331

§ 371 (c)(1),
(2), (4) Date: Apr. 25, 2006

(87) PCT Pub. No.: WO2005/005490

PCT Pub. Date: Jan. 20, 2005

(65) Prior Publication Data

US 2006/0241280 A1    Oct. 26, 2006

(30) Foreign Application Priority Data

Jul. 11, 2003    (JP) .............................. 2003-273735

(51) Int. Cl.
*C08F 6/00* (2006.01)
*C08J 3/00* (2006.01)
(52) U.S. Cl. ........................... 528/480; 34/368; 203/37; 203/95; 528/483; 528/500
(58) Field of Classification Search ................... 34/368; 203/37, 95; 528/483, 500, 480
See application file for complete search history.

(56) References Cited

FOREIGN PATENT DOCUMENTS

| JP | 58-124777 | 7/1983 |
|---|---|---|
| JP | 62-97601 | 5/1987 |
| JP | 2001-329016 | 11/2001 |
| JP | 2004-91752 | 3/2004 |

OTHER PUBLICATIONS

"Petrochemical Process" compiled by the Japan Petroleum Institute, Continuous polymerization process flow of BR, Fig. 13.1, p. 334, Kodansha Publishing Co., 2001. (with partial English translation.)

*Primary Examiner*—Terressa M Boykin
(74) *Attorney, Agent, or Firm*—Oblon, Spivak, McClelland, Maier & Neustadt, P.C.

(57) ABSTRACT

An objective of the present invention is to provide a desolvation method for removing a solvent efficiently from a polymer solution. In the present desolvation method where the solvent is removed from the polymer solution by steam stripping using an apparatus comprising a pipe which connects a gas phase portion of a desolvation tank at the downstream and a liquid phase portion of a desolvation tank at the upstream, and an opening-degree adjusting mean (for example, pressure adjusting valve) fixed to this pipe, pressures are controlled such that a pressure difference ($\Delta P = P_2 - P_1$) between pressures of each gas phase portion of desolvation tanks at the downstream and at the upstream is allowed to be larger by from 0.005 to 0.6 MPa, preferably from 0.05 to 0.3 MPa than a pressure difference when the opening-degree adjusting mean is fully opened. In addition, in another present invention, pressures are controlled such that the pressure difference between pressures of each gas phase portion of desolvation tanks at the downstream and at the upstream is allowed to be 0.036 MPa or larger, preferably 0.1 MPa or larger.

22 Claims, 6 Drawing Sheets

Fig.9

METHOD FOR DESOLVATION OF POLYMER SOLUTION

TECHNICAL FIELD

The present invention relates to a desolvation method of a polymer solution and, more specifically to a desolvation method for removing a solvent efficiently from a polymer solution prepared by solution polymerization.

BACKGROUND ART

Recovery of a polymer contained in the polymer solution produced by solution polymerization is ordinarily achieved by washing the polymer solution with water to decompose a catalyst residue and the like and remove, and devolatalizing a volatile component such as solvent, unreacted monomers and remained water in a small amount to remove from the polymer solution. In addition, this devolatalization is conventionally performed by a method in which the polymer solution is concentrated in advance according to a flash evaporation method or the like and then the solvent is removed by steam stripping, and the like. This steam stripping is performed by supplying steam to a desolvation tank ordinarily from a bottom portion thereof and then allowing the solvent and steam to contact, however, in the case only one desolvation tank is used, there is a case in which the system in the desolvation tank is in an equilibrium state and the desolvation can not efficiently be performed. Thus, a method for performing a multiple-step desolvation by using a plurality of desolvation tanks connected in series with one another, ordinarily, two desolvation tanks has been proposed and is in a practical use (for example, referred to non-patent document 1).

[Non-Patent Document 1]

"Petrochemical Process" compiled by the Japan Petroleum Institute, Continuous polymerization process flow of BR, FIG. 13.1, p. 334, Kodansha Publishing Co., Aug. 10, 2001.

DISCLOSURE OF THE INVENTION

Problems to be Solved by the Invention

According to the method using a plurality of desolvation tanks, an amount of the solvent which remains in the polymer can be more reduced compared with a case in which only one desolvation tank is used. However, there is a case in which desolvation can not fully be performed depending on operational conditions and the like and it is required to surely reduce the amount of the remaining solvent.

The present invention has been made under these circumstances and an objective is to provide a desolvation method of a polymer solution for removing a solvent efficiently from a polymer solution prepared by solution polymerization.

Means for Solving Problems

The present invention is as follows.

1. A desolvation method of a polymer solution, in which a solvent is removed by steam stripping using an apparatus comprising a desolvation tank disposed at the upstream, a desolvation tank disposed at the downstream, a pipe that connects a gas phase portion of the desolvation tank at the downstream and a liquid phase portion of the desolvation tank at the upstream and at least one opening-degree adjusting mean fixed to the pipe, being characterized by controlling pressures such that a pressure difference ($\Delta P = P_2 - P_1$) between pressure ($P_2$) of the gas phase portion of the desolvation tank at the downstream and pressure ($P_1$) of the gas phase portion of the desolvation tank at the upstream is allowed to be larger by from 0.005 to 0.6 MPa than a pressure difference ($\Delta P_0 = P_{20} - P_{10}$) between pressure ($P_{20}$) of the gas phase portion of the desolvation tank at the downstream and a pressure ($P_{10}$) of the gas phase portion of the desolvation tank at the upstream when the opening-degree adjusting mean is fully opened.

2. The desolvation method of a polymer solution according to 1 above, wherein pressure of the gas phase portion of the desolvation tank at the downstream is in the range from 0.02 to 1 MPaG.

3. The desolvation method of a polymer solution according to 2 above, wherein temperature of the liquid phase portion of the desolvation tank at the downstream is in the range from 100° C. to 200° C.

4. The desolvation method of a polymer solution according to 3 above, wherein the solvent is at least one type selected from the group consisting of cyclohexane, cyclopentane, cycloheptane, toluene, benzene, xylene, n-hexane, n-pentane, isopentane, n-heptane, n-octane, n-decane and dichloromethane.

5. The desolvation method of a polymer solution according to 4 above, wherein polymer contained in the polymer solution is butadiene rubber, isoprene rubber, styrene-butadiene rubber, styrene•isoprene rubber, ethylene- α-olefin copolymer rubber, ethylene•α-olefin•non-conjugated diene copolymer rubber, butyl rubber, styrene•butadiene•styrene block copolymer, hydrogenated styrene•butadiene•styrene block copolymer, butadiene resin or acrylic resin.

6. The desolvation method of a polymer solution according to 1 above, wherein temperature of the liquid phase portion of the desolvation tank at the downstream is in the range from 100° C. to 200° C.

7. The desolvation method of a polymer solution according to 1 above, wherein the opening-degree adjusting mean is a pressure adjusting valve or an orifice plate.

8. The desolvation method of a polymer solution according to 1 above, wherein concentration of the solvent remaining in a solvent-containing polymer to be loaded in the desolvation tank at the downstream is 10% by mass or less.

9. The desolvation method of a polymer solution according to 1 above, wherein the polymer solution is continuously supplied and polymer contained in the polymer solution is continuously recovered.

10. The desolvation method of a polymer solution according to 1 above, wherein polymer contained in the polymer solution is butadiene rubber, isoprene rubber, styrene-butadiene rubber, styrene•isoprene rubber, ethylene•α-olefin copolymer rubber, ethylene•α-olefin•non-conjugated diene copolymer rubber, butyl rubber, styrene•butadiene•styrene block copolymer, hydrogenated styrene•butadiene•styrene block copolymer, butadiene resin or acrylic resin.

11. The desolvation method of a polymer solution according to 1 above, wherein the solvent is at least one type selected from the group consisting of cyclohexane, cyclopentane, cycloheptane, toluene, benzene, xylene, n-hexane, n-pentane, isopentane, n-heptane, n-octane, n-decane and dichloromethane.

12. A desolvation method of a polymer solution, in which a solvent is removed by steam stripping using an apparatus comprising a desolvation tank disposed at the upstream, a desolvation tank disposed at the downstream, a pipe that connects a gas phase portion of the desolvation tank at the downstream and a liquid phase portion of the desolvation tank at the upstream and at least one opening-degree adjusting mean fixed to the pipe, being characterized by controlling pressures such that a pressure difference ($\Delta P=P_2-P_1$) between pressure ($P_2$) of the gas phase portion of the desolvation tank at the downstream and pressure ($P_1$) of the gas phase portion of the desolvation tank at the upstream is allowed to be 0.036 MPa or larger.

13. The desolvation method of a polymer solution according to 12 above, wherein pressure of the gas phase portion of the desolvation tank at the downstream is in the range from 0.02 to 1 MPaG.

14. The desolvation method of a polymer solution according to 13 above, wherein temperature of the liquid phase portion of the desolvation tank at the downstream is in the range from 100° C. to 200° C.

15. The desolvation method of a polymer solution according to 14 above, wherein the solvent is at least one type selected from the group consisting of cyclohexane, cyclopentane, cycloheptane, toluene, benzene, xylene, n-hexane, n-pentane, isopentane, n-heptane, n-octane, n-decane and dichloromethane.

16. The desolvation method of a polymer solution according to above, wherein polymer contained in the polymer solution is butadiene rubber, isoprene rubber, styrene-butadiene rubber, styrene•isoprene rubber, ethylene•α-olefin copolymer rubber, ethylene•α-olefin•non-conjugated diene copolymer rubber, butyl rubber, styrene•butadiene•styrene block copolymer, hydrogenated styrene•butadiene•styrene block copolymer, butadiene resin or acrylic resin.

17. The desolvation method of a polymer solution according to 12 above, wherein temperature of the liquid phase portion of the desolvation tank at the downstream is in the range from 100° C. to 200° C.

18. The desolvation method of a polymer solution according to 12 above, wherein the opening-degree adjusting mean is a pressure adjusting valve or an orifice plate.

19. The desolvation method of a polymer solution according to 12 above, wherein concentration of the solvent remaining in a solvent-containing polymer to be loaded in the desolvation tank at the downstream is 10% by mass or less.

20. The desolvation method of a polymer solution according to 12 above, wherein the polymer solution is continuously supplied and polymer contained in the polymer solution is continuously recovered.

21. The desolvation method of a polymer solution according to 12 above, wherein polymer contained in the polymer solution is butadiene rubber, isoprene rubber, styrene-butadiene rubber, styrene•isoprene rubber, ethylene•α-olefin copolymer rubber, ethylene•α-olefin•non-conjugated diene copolymer rubber, butyl rubber, styrene•butadiene•styrene block copolymer, hydrogenated styrene•butadiene•styrene block copolymer, butadiene resin or acrylic resin.

22. The desolvation method of a polymer solution according to 12 above, wherein the solvent is at least one type selected from the group consisting of cyclohexane, cyclopentane, cycloheptane, toluene, benzene, xylene, n-hexane, n-pentane, isopentane, n-heptane, n-octane, n-decane and dichloromethane.

Effects of the Invention

According to the desolvation method of a polymer solution of the present invention, a solvent can efficiently be removed from a polymer solution by controlling pressures such that a pressure difference between pressures of each desolvation tank at the upstream and at the downstream is allowed to be larger than a pressure difference when the opening-degree adjusting mean is fully opened.

According to the other desolvation method of a polymer solution of the present invention, a solvent can efficiently be removed from a polymer solution by specifying a pressure difference between pressures of each desolvation tank at the upstream and at the downstream.

In addition, in the case a pressure of the gas phase portion of the desolvation tank at the downstream is in the range from 0.02 to 1 MPaG, the solvent can efficiently be removed from a solution containing various types of polymers regardless of the types of the polymers.

Further, in the case temperature of the liquid phase portion of the desolvation tank at the downstream is in the range from 100° C. to 200° C., the solvent can particularly efficiently be removed regardless of the type of the solvent.

Additionally, in the case the opening-degree adjusting mean is a pressure adjusting valve or an orifice plate, it is easy to control the pressure and the solvent can efficiently be removed.

Furthermore, in the case concentration of the solvent remaining in a solvent-containing polymer to be loaded in the desolvation tank at the downstream is 10% by mass or less, the solvent can be removed from the solvent-containing polymer more easily at the downstream.

In addition, in the case the polymer solution is continuously supplied and the polymer contained in the polymer solution is continuously recovered, removal of the solvent and recovery of the polymer can efficiently be performed.

Still furthermore, in the case the polymer contained in the polymer solution is specified, the solvent can efficiently be removed regardless of the type of the polymer.

Additionally, in the case the solvent is specified, the solvent can be removed more easily.

DESCRIPTION OF THE REFERENCE NUMERALS AND SIGNS

11; desolvation tank at the upstream, 12; desolvation tank at the downstream, 111, 121; gas phase portion, 112, 122; liquid phase portion, 113, 123; stirring blade, 114; warm water supply source, 1141; pipe for supplying warm water, 124; steam supply source at the downstream, 1241; pipe for supplying steam at the downstream, 2; polymer tank, 21; pipe for charging polymer solution, 22; gear pump, 23; stirring blade, 3; steam supply source for polymer solution, 31; steam supply pipe for polymer solution, 4; pipe for transferring solvent-containing polymer, 41; pump for transferring solvent-containing polymer, 5; pipe for transferring solvent-containing steam, 51; pressure adjusting valve, 6; polymer recovery apparatus, 61; pipe for transferring recovered polymer, 62; pump for transferring recovered polymer, 7; solvent recovery apparatus, 71; cooler, 72; decanter, 73; pipe for transferring steam-containing solvent, 74; pump for recovering solvent, 75; pipe for transferring water, and 76; pump for transferring water.

BEST MODE FOR CARRYING OUT THE INVENTION

The desolvation method of a polymer solution of the present invention is to remove a solvent by steam stripping using an apparatus comprising a desolvation tank disposed at the upstream, a desolvation tank disposed at the downstream, a pipe that connects a gas phase portion of the desolvation tank at the downstream and a liquid phase portion of the desolvation tank at the upstream and at least one opening-degree adjusting mean fixed to the pipe.

The "desolvation tank disposed at the upstream" mentioned above and the "desolvation tank disposed at the downstream" mentioned above are used while connecting in series to each other. In the desolvation method according to the present invention, the "desolvation tank at the downstream" is a tank in which a pressure is controlled to be high such that a pressure difference with the desolvation tank at the upstream becomes large. In addition, in the other desolvation method according to the present invention, the "desolvation tank at the downstream" is a tank in which a pressure is controlled to be high such that a pressure difference with the desolvation tank at the upstream becomes higher than a specified value. Still further, the "desolvation tank at the upstream" is a tank which is disposed in front of the each "desolvation tank at the downstream" mentioned above and has a lower pressure by a specified value than that of the desolvation tank at the downstream.

Regarding the "apparatus" mentioned above, one or more other desolvation tanks may be connected further front side of the desolvation tank at the upstream, one or more other desolvation tanks may be connected further back side of the desolvation tank at the downstream, and one or more other desolvation tanks may further be connected to each of the desolvation tank at the upstream and the desolvation tank at the downstream. The solvent is separated and removed in the desolvation tank in which a greater part of the polymer solution is charged, namely, the foremost desolvation tank. Therefore, it is preferable to use two tanks in total, namely, one desolvation tank at the upstream and one desolvation tank at the downstream as the desolvation tank.

In the case the apparatus does not comprise other desolvation tanks, namely, the desolvation tank comprises two tanks of the desolvation tank at the upstream and the desolvation tank at the downstream, the polymer solution which is transferred from a polymerization apparatus, a polymer tank which stores the polymer solution or the like is charged into the desolvation tank at the upstream. In addition, a polymer having a small amount of solvent remained after the desolvation in the desolvation tank at the upstream is transferred into the desolvation tank at the downstream. And further desolvation is conducted to recover a polymer having a trace amount of solvent remained. Thereafter, in this desolvation tank at the downstream according to the desolvation method of the present invention, the pressure is controlled such that the pressure difference with the desolvation tank at the upstream comes to be larger. Further, in the other desolvation method of the present invention, the pressure in the desolvation tank at the downstream is controlled such that the pressure difference with the desolvation tank at the upstream comes to be a specified value or larger.

In the case the apparatus comprises other desolvation tanks and comprises three or more desolvation tanks, when other desolvation tanks are connected further in upstream of the desolvation tank at the upstream, the polymer solution is charged into the foremost tank among these other desolvation tanks. Generally a pressure of this other desolvation tank is equally likely with that of the desolvation tank at the upstream and this tank is disposed such that the desolvation tank at the upstream is allowed to be fully functionalized. In addition, when other desolvation tanks are connected further at downstream of the desolvation tank at the downstream, the polymer subjected to desolvation is recovered from the last tank among these other desolvation tanks. Generally a pressure of this other desolvation tank is equally likely with that of the desolvation tank at the downstream. And this tank is disposed for the purpose that the solvent-containing polymer which was transferred from the desolvation tank is further subjected to desolvation in order to reduce a remaining solvent therein. Pressures of the desolvation tank at the upstream and the other tank connected in front of the upstream above and each pressure of other tanks when there are two or more other desolvation tanks may be same with or different from one another. Additionally, pressures of the desolvation tank at the downstream and the other tanks connected at downstream of the desolvation tank at the downstream above and each pressure of other tanks when there are two or more other desolvation tanks may be same with or different from one another.

A pipe is disposed between the desolvation tank at the upstream and the desolvation tank at the downstream, for the purpose of connecting a liquid phase portion of the desolvation tank at the upstream and the gas phase portion the desolvation tank at the downstream, and transferring the polymer containing the solvent in the desolvation tank at the upstream to the desolvation tank at the downstream. In addition, a pipe is connected for the purpose of connecting the gas phase portion of the desolvation tank at the downstream and the liquid phase portion of the desolvation tank at the upstream, and transferring steam containing the solvent in the desolvation tank at the downstream to the desolvation tank at the upstream. Still further, at least one opening-degree adjusting mean is fixed to the pipe for transferring steam containing the solvent. The opening-degree adjusting mean is not particularly limited and for example a pressure adjusting valve, an orifice plate and the like are mentioned.

According to the present desolvation method and other desolvation method of the present invention, when the apparatus comprising the desolvation tanks at the upstream and the downstream as described above is used, the polymer solution can be continuously supplied, the polymer contained in the polymer solution can continuously be recovered and the polymer in which the solvent is remained in extremely low amount can efficiently be recovered.

In the desolvation method according to the present invention, pressures are controlled such that a pressure difference ($\Delta P = P_2 - P_1$) between pressure ($P_2$) of the gas phase portion of the desolvation tank at the downstream and pressure ($P_1$) of the gas phase portion of the desolvation tank at the upstream is allowed to be larger by from 0.005 to 0.6 MPa than a pressure difference ($\Delta P_0 = P_{20} - P_{10}$) between pressure ($P_{20}$) of the gas phase portion of the desolvation tank at the downstream and a pressure ($P_{10}$) of the gas phase portion of the desolvation tank at the upstream when the opening-degree adjusting mean is fully opened. A difference between $\Delta P$ and $\Delta P_0$ ($\Delta P - \Delta P_0$) when the pressure is adjusted as such manner is preferably from 0.01 to 0.4 MPa, more preferably from 0.02 to 0.4 MPa and particularly preferably from 0.05 to 0.3 MPa. $\Delta P_0$ varies depending on operational conditions at the time of desolvation and the like, however, it is ordinarily from 0.012 to 0.035 MPa. And the pressure can be adjusted such that $\Delta P$ is larger than $\Delta P_0$ by preferably from 0.005 to 0.6 MPa, more preferably from 0.01 to 0.4 MPa, still more preferably from 0.02 to 0.4 MPa and particularly preferably from 0.05 to 0.3 MPa. It is preferable that $\Delta P$ after adjusting pressure as such is 0.036 MPa or larger (ordinarily, 1.0 MPa or less). Owing to this, efficiency of desolvation in the desolvation tank at the downstream is improved. Further, a concentration of the solvent remaining in the recovered polymer can be preferably 0.7% by mass or less, more preferably 0.5% by mass or less and particularly preferably 0.3% by mass or less.

Furthermore, in the other desolvation method according to the present invention, pressures are controlled such that a pressure difference ($\Delta P = P_2 - P_1$) between pressure ($P_2$) of the gas phase portion of the desolvation tank at the downstream and pressure ($P_1$) of the gas phase portion of the desolvation tank at the upstream is allowed to be 0.036 MPa or larger. This $\Delta P$ is preferably 0.04 MPa or larger, more preferably 0.05 MPa or larger, still more preferably 0.075 MPa or larger and particularly preferably from 0.1 MPa or larger. However, it is generally 1.0 MPa or less. Further, such pressure adjustment can be performed in a same manner as described above. Namely, $\Delta P_0$ is ordinarily from 0.012 to 0.035 MPa. And the pressure can be adjusted such that $\Delta P$ is larger than $\Delta P_0$ by preferably from 0.005 to 0.6 MPa, more preferably from 0.01 to 0.4 MPa, still more preferably from 0.02 to 0.4 MPa and particularly preferably from 0.05 to 0.3 MPa. In the desolvation tank at the downstream where the pressure was adjusted, efficiency of desolvation is improved, and a concentration of the solvent remaining in the recovered polymer can be preferably 0.7% by mass or less, more preferably 0.5% by mass or less and particularly preferably 0.3% by mass or less.

In addition, the pressure of the desolvation tank at the downstream according to the present desolvation method and other desolvation method of the present invention, is not particularly limited and can be in the range from 0.02 to 1 MPaG. This pressure is preferably in the range from 0.02 to 0.6 MPaG, more preferably from 0.05 to 0.5 MPaG, still more preferably from 0.05 to 0.4 MPaG, particularly preferably from 0.08 to 0.4 MPaG and most preferably from 0.09 to 0.4 MPaG. If this pressure is less than 0.02 MPaG, desolvation efficiency can not fully be improved. And if the pressure is more than 1 MPaG, there may cause a problem in which the polymer is deteriorated, which is not favorable.

The temperature of the desolvation tank at the downstream is risen by increasing the pressure. It is preferable that this temperature is set to be a predetermined value by taking into consideration of a type of a solvent, a concentration target of a remaining solvent and the like. The temperature can easily be adjusted by controlling the pressure of the desolvation tank at the downstream. The temperature of the desolvation tank at the downstream is not particularly limited and is preferably in the range from 100 to 200° C., more preferably from 105 to 150° C. and still more preferably from 110 to 140° C.

An amount of the solvent remaining in the solvent-containing polymer to be charged to the desolvation tank at the downstream is not limited and is preferably 10% by mass or less, more preferably 7% by mass or less, still more preferably 5% by mass or less and particularly preferably from 0.2 to 3% by mass. So long as the amount of the solvent remaining in the solvent-containing polymer is 10% by mass or less, in the case the pressure is controlled such that $\Delta P - \Delta P_0$ in the desolvation method according to the present invention, or $\Delta P$ in other desolvation method according to the present invention comes within a specified range of value, the desolvation in the desolvation tank at the downstream can more efficiently be performed. The concentration of the solvent remaining in the polymer recovered from the desolvation tank at the last can be 2% by mass or less, preferably 1.5% by mass or less, more preferably 0.7% by mass or less, still more preferably from 0.1 to 0.7% by mass and particularly preferably from 0.1 to 0.5% by mass.

When the desolvation is performed, steam is supplied to the foremost, namely, to at least one of the liquid phase portion of the desolvation tank into which the polymer solution is charged and the pipe for charging the polymer solution in order to charge the polymer solution into this desolvation tank. In this case, it is preferable that steam is supplied in the pipe for charging the polymer solution in order to charge the polymer solution into this desolvation tank. In addition, steam may be supplied to each of the desolvation tank and the pipe for charging the polymer solution, but it is not necessary to do so. Still further, steam is also supplied to the liquid phase portion of the desolvation tank at the last. In the case three or more desolvation tanks are used, steam may either be supplied or not, to other desolvation tank interposed between the foremost and the last tanks.

Steam which is supplied in such manner comes in contact with the polymer solution in the liquid phase portion of the foremost desolvation tank and/or in the pipe for charging the polymer solution, the solvent contained in the polymer solution is evaporated. Then, the thus-evaporated solvent is separated from the polymer in the gas phase portion of the desolvation tank and to perform desolvation. In addition, in other tanks, the polymer containing a small amount of solvent is transferred from the liquid phase portion of the desolvation tank at the upstream to the gas phase portion of the desolvation tank at the downstream in sequence, by the pipe for transferring the solvent-containing polymer disposed between these tanks. After that, the solvent-containing polymer is dropped in each liquid phase portion of desolvation tank and comes in contact with steam in the liquid phase portions to further separate and remove the solvent. On the other hand, the solvent-containing steam is transferred from the gas phase portion of the desolvation tank at the downstream to the liquid phase portion of the desolvation tank at the upstream in sequence, by the pipe for transferring the solvent-containing steam disposed between two of tanks. Thus, the solvent is further separated in respective desolvation tanks and removed therefrom and the solvent-containing steam is taken out from an upper portion, generally the top of the foremost desolvation tank to separate the solvent and steam and recover. Further, the polymer having a trace amount of solvent remained is taken out from a lower portion, generally, the bottom of the desolvation tank at the last, and is transferred to the polymer recovery step to recover.

The pressure and the temperature of steam to be supplied to the foremost desolvation tank and/or to the pipe for charging the polymer solution are not particularly limited so long as desolvation is efficiently performed, however, the pressure is preferably in the range from 0.1 to 10 MPaG and particularly preferably from 0.2 to 2 MPaG. And the temperature is preferably in the range from 110° C. to 320° C. and particularly preferably from 130 to 220° C. In addition, although an amount of steam to be supplied varies depending on the number of desolvation tanks, the type of the solvent, the temperature of the polymer solution, the concentration of the residual solvent to be targeted and the like, it is preferably from 0.1 to 0.7 in terms of a mass ratio (mass of steam/mass of solvent) with the solvent contained in the polymer solution. This mass ratio is more preferably from 0.2 to 0.6 and still more preferably from 0.3 to 0.5. If this mass ratio is less than 0.1, there is a tendency in which the desolvation can not fully be performed. On the other hand, if this mass ratio is 0.7, the desolvation can efficiently be performed and, it is not necessary to use a larger amount of steam.

In addition, the pressure and the temperature of steam to be supplied to the desolvation tank at the last are not limited. The pressure is preferably in the range from 0.1 to 10 MPaG and particularly preferably from 0.2 to 2 MPaG, while the temperature is preferably in the range from 110° C. to 320° C. and particularly preferably from 130° C. to 220° C. Further, an amount of steam to be supplied to this tank at the last (when three or more tanks are used and steam is supplied to also a tank interposed between the foremost and the last tanks, the amount is a sum of steam to be supplied to the last tank and the tank disposed in the midway) is not limited, however, it is, in terms of the mass ratio, preferably from 0.2 time to 20 times amount of steam to be supplied to the foremost desolvation tank and/or the pipe charging for the polymer solution, and particularly preferably from 1 to 20 times as much.

The apparatus to be used in the desolvation of the polymer solution according to the present invention is not particularly limited and, for example, such desolvation apparatus as described below can be used.

This apparatus comprises, as the desolvation tank, a desolvation tank at the upstream which is disposed in the upstream and a desolvation tank at the downstream which is disposed at the downstream.

Additionally, this apparatus comprises a pipe for charging a polymer solution which connects a gas phase portion of the foremost desolvation tank and a polymerization apparatus or a polymer tank which stores the polymer solution; a steam supply source for the polymer solution and a steam supply pipe for the polymer solution, in order to supply steam into the gas phase portion of the foremost desolvation tank and/or a pipe for charging the polymer solution; a pipe for transferring a solvent-containing steam which connects the desolvation tank at the downstream and the desolvation tank at the upstream; an opening-degree adjusting mean which is fixed to this pipe for transferring the solvent-containing steam, such as a pressure adjusting valve or an orifice plate; a steam supply source at the downstream and a pipe for supplying steam at the downstream, in order to supply steam to the desolvation tank at the last; a polymer recovery apparatus; a pipe for transferring a recovered polymer which connects the polymer recovery apparatus and the desolvation tank at the last; a solvent recovery apparatus and a pipe for transferring the stream-containing solvent which connects the solvent recovery apparatus and the foremost desolvation tank.

The steam into the liquid phase portion of, the desolvation tank at the last may be supplied from the bottom or the side of this tank, however, it is preferable to supply steam from the bottom, particularly, from the central of the bottom in order to allow all amount of the polymer to be evenly in contact with steam.

In the case a polymer is produced by solution polymerization, an amount of the solvent to be contained in the polymer solution after the polymerization varies depending on the type of the polymer, the type of the solvent, polymerization conditions and the like, however, the amount is generally in the range from 30 to 95% by mass, preferably from 50 to 95% by mass and more preferably from 70 to 95% by mass based on 100% by mass of the polymer solution. Most of this solvent is separated from the polymer in the foremost desolvation tank to remove. When the solvent-containing polymer is charged into the desolvation tank at the downstream, the residual solvent in the solvent-containing polymer is preferably 10% by mass or less, more preferably 7% by mass or less, still more preferably 5% by mass or less and particularly preferably from 0.2 to 3% by mass. In the case the amount of the residual solvent is such small, controlling pressures to allow $\Delta P - \Delta P_0$ in the desolvation method of the present invention or $\Delta P$ in other desolvation method of the present invention during desolvation to be in a specific range leads to an efficient removal of the solvent.

As for the "polymer solution" mentioned above, a solution which contains both a polymer produced by solution polymerization and a solvent can be used.

Such polymer is not particularly limited so long as it is produced by solution polymerization. Examples of the polymer include butadiene rubber, isoprene rubber, styrene•butadiene copolymer such as styrene•butadiene rubber, styrene•isoprene copolymer such as styrene•isoprene rubber, ethylene•α-olefin copolymer such as ethylene•α-olefin copolymer rubber and ethylene•α-olefin•non-conjugated diene copolymer rubber, butyl rubber, styrene•butadiene•styrene block copolymer, hydrogenated styrene•butadiene•styrene block copolymer, butadiene resin, acrylic resin and the like. Among these, butadiene rubber, styrene-butadiene rubber, styrene•butadiene•styrene block copolymer, hydrogenated styrene•butadiene•styrene block copolymer and the like are preferred.

Although a number average molecular weight (Mn) of the polymer is not particularly limited, Mn of the polymer which is efficiently subjected to desolvation is, preferably from 5,000 to 5,000,000, more preferably from 20,000 to 1,000,000, and still more preferably from 50,000 to 500,000.

In addition, the type of the solvent is not particularly limited, however, an alicyclic hydrocarbon solvent such as cyclohexane, cyclopentane and cycloheptane; an aromatic hydrocarbon solvent such as toluene, xylene and benzene; an aliphatic hydrocarbon solvent such as n-hexane, n-pentane, isopentane, n-heptane, n-octane and n-decane; a halogenated hydrocarbon solvent such as dichloromethane and the like that are ordinarily used in solution polymerization. Among these, solvent that is particularly frequently used is n-hexane, n-heptane, cyclohexane and toluene. This solvent may be used either alone or a mixture comprising two types or more may be used.

A boiling point of the solvent at a pressure of 0.1 MPa is preferably in the range from 30° C. to 150° C., and particularly preferably from 60° C. to 120° C. So long as the solvent has such boiling point in the range, the solvent can easily be in azeotropy with water at the time of desolvation and a desolvation can more easily sufficiently be performed.

Further, a viscosity of the polymer solution at the time of desolvation is not particularly limited, however, for the purpose of performing a desolvation efficiently, it is preferably in the range from 0.001 to 300 Pa·s, more preferably from 0.005 to 200 Pa·s and particularly preferably from 0.01 to 100 Pa·s. Additionally, although a content of the polymer in the polymer solution is not particularly limited, it is preferably in the range from 5 to 70% by mass, more preferably from 5 to 50% by mass and particularly preferably from 5 to 30% by mass based on 100% by mass of the polymer solution. When the content of the polymer is unduly high, the pipe and the like may sometimes be clogged, on the other hand, when it is unduly low, it is sometimes hardly performed that the polymer is recovered efficiently.

EXAMPLES

Hereinafter, the present invention is specifically described.

[1] Basic Experiment

Desolvation was performed by using an apparatus in which two desolvation tanks were comprised and a pressure adjusting valve was fixed to a pipe for transferring solvent-containing steam from the downstream to the upstream, and correlations between the pressure and the temperature of each tank, and the concentration of the residual solvent were studied as described below.

(1) In a case in which a pressure difference between the desolvation tank at the upstream and the desolvation tank at the downstream is a pressure difference generated in the operational state at the time the pressure adjusting valve as an opening-degree adjusting mean is fully opened Desolvation was started by supplying steam such that a mass ratio of steam against a polymer solution was changed and the pressure of the desolvation tank at the upstream came to be 0.03 MPaG at each mass ratio. The pressure of the desolvation tank at the downstream in this time was 0.043 MPaG and the pressure difference was 0.013 MPa. (This is a sum of 0.012 MPa which was a pressure corresponding to a submerged water level in the desolvation tank at the upstream and 0.001 MPa which was a pressure loss of pipe 4 for transferring the solvent-containing polymer.) After that, the amount supplied of steam to the desolvation tank at the downstream was increased and the pressure of the tank at the upstream was controlled such that it came to be higher as being 0.04 MPaG and further 0.05 MPaG using the pressure adjusting valve. The pressure of the desolvation tank at the downstream in this time became 0.053 MPaG and further 0.063 MPaG. And the pressure difference became 0.013 MPa each. Regarding cases where pressures were controlled in such manner as described above, the concentration of residual solvent in solvent-containing polymer for each pressure at an outlet of the desolvation tank at the upstream were quantitatively determined by using a chromatographic apparatus attached with an FID detector.

Figure 1:
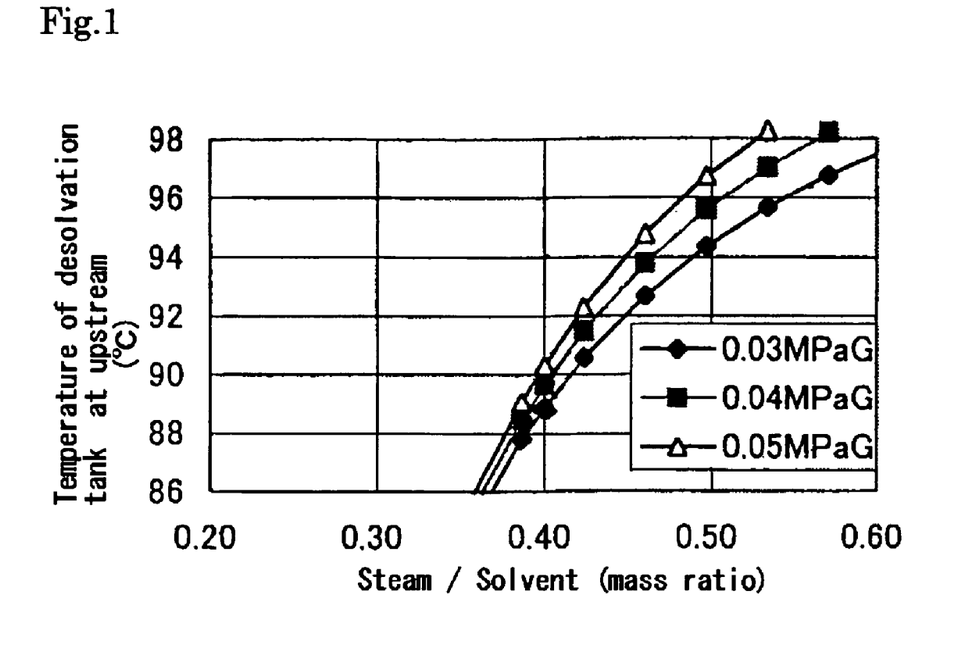
FIG. 1 is a graph showing a correlation between mass ratio of steam against the solvent in the desolvation tank at the upstream and pressure, and temperature.
Figure 2:
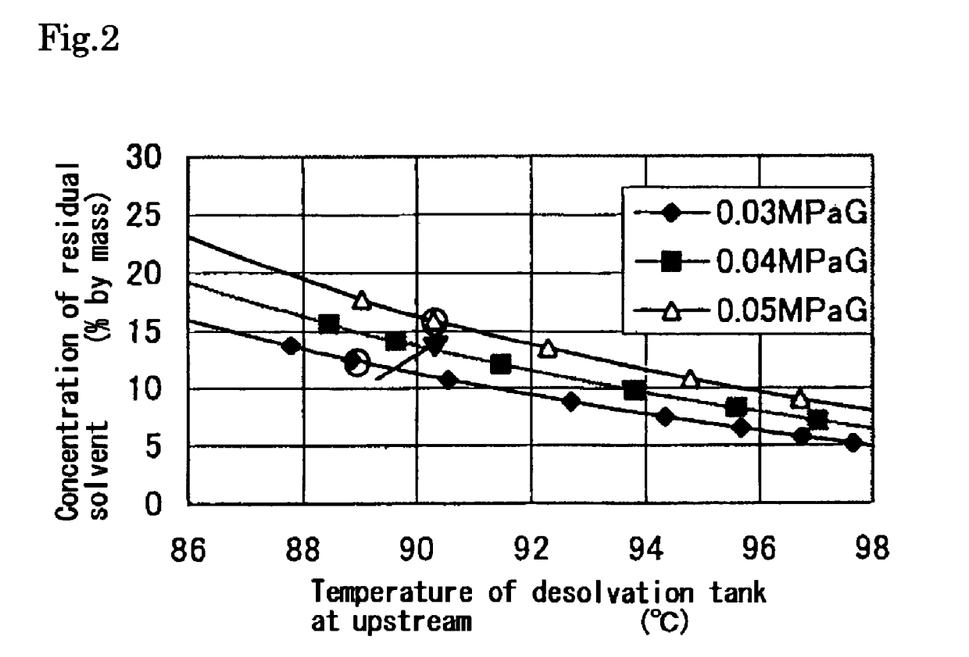
FIG. 2 is a graph showing a correlation between temperature and pressure in the desolvation tank at the upstream, and concentration of the residual solvent.

The result was as shown in FIG. 1, and as the mass ratio of steam against the solvent became larger, or, as the pressure of the tank became larger even if the mass ratio thereof was same, the temperature became higher. And, as shown for example the case in which the mass ratio of steam against the solvent is 0.40 by arrow mark in FIG. 2, it was found that, as the pressure became higher, there was a tendency in that the concentration of residual solvent became higher.

In addition, concentrations of the residual solvent of the solvent-containing polymer under each pressure at the outlet of the desolvation tank at the downstream were quantitatively determined in a same manner.

Figure 3:
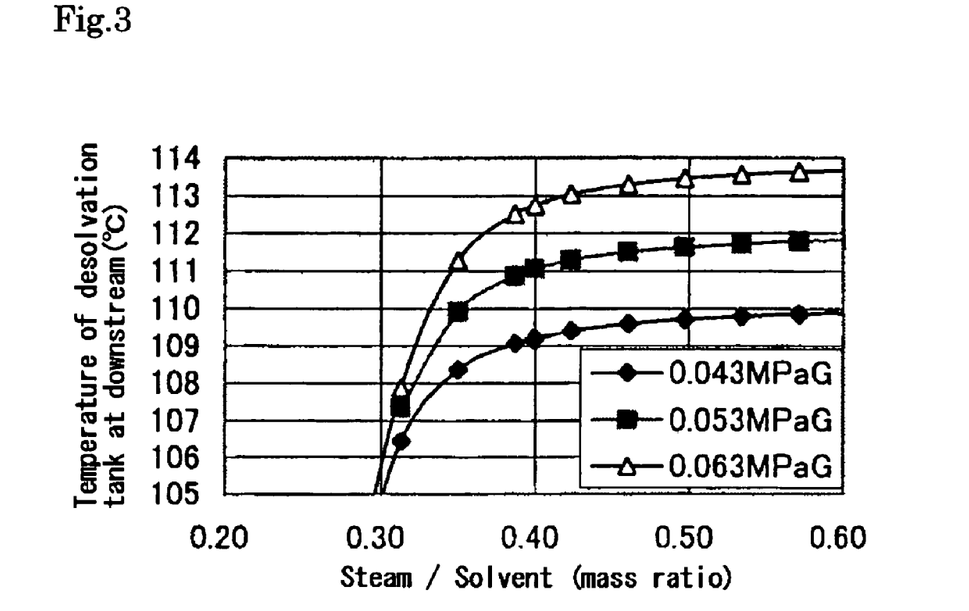
FIG. 3 is a graph showing a correlation between mass ratio of steam against the solvent in the desolvation tank at the downstream and pressure, and temperature.
Figure 4:
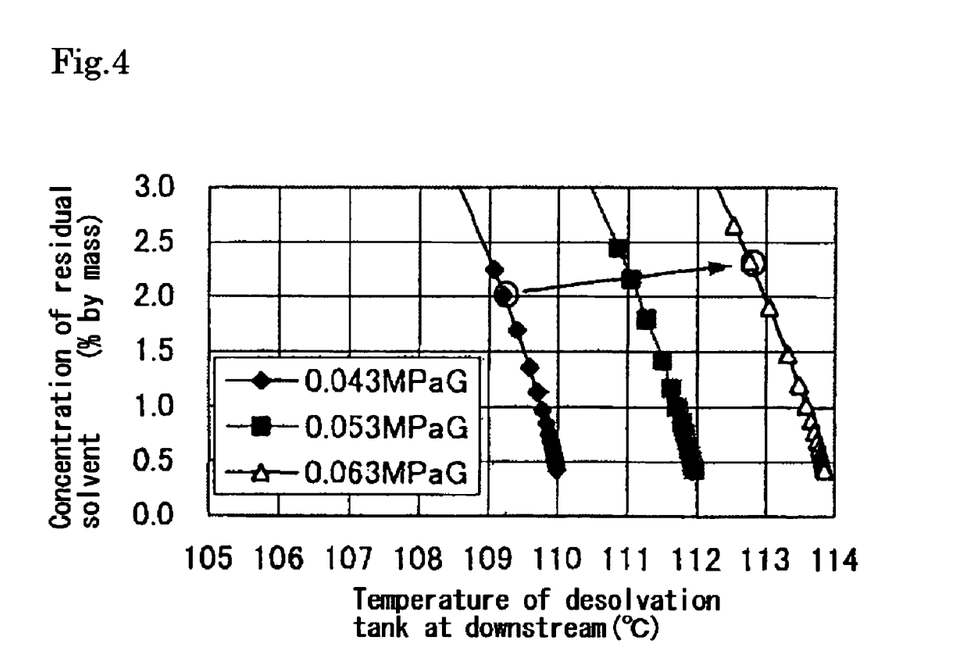
FIG. 4 is a graph showing a correlation between temperature and pressure in the desolvation tank at the downstream, and concentration of the residual solvent, when pressures in desolvation tanks at the upstream and the downstream are simultaneously raised.

The result was shown in FIG. 3, and as the mass ratio of steam against the solvent became larger, or, as the pressure of the tank became larger even if the mass ratio thereof was same, the temperature became higher. And, as shown for example the case in which the mass ratio of steam against the solvent is 0.40 by arrow mark in FIG. 4, when pressures of respective tanks at the upstream and at the downstream were simultaneously higher, as the pressures became higher, there was a tendency in that the concentration of the residual solvent became higher.

(2) In a case in which a pressure difference between the desolvation tank at the upstream and the desolvation tank at the downstream is controlled to be larger than a pressure difference generated in the operational state at the time the pressure adjusting valve as an opening-degree adjusting mean is fully opened Desolvation was started by supplying steam such that a mass ratio of steam against a polymer solution was changed and the pressure of the desolvation tank at the upstream came to be 0.03 MPaG at each mass ratio. The pressure of the desolvation tank at the downstream in this time was 0.043 MPaG and the pressure difference was 0.013 MPa. After that, the amount supplied of steam to the desolvation tank at the downstream was increased and the pressure of the tank at the downstream was just controlled such that it came to be higher as being 0.053 MPaG and further 0.063 MPaG using the pressure adjusting valve. And pressure differences in this time were 0.023 MPa and 0.033 MPa, respectively. Regarding cases where pressures were controlled in such manner as described above, the concentration of residual solvent in solvent-containing polymer for each pressure at an outlet of the desolvation tank at the downstream were quantitatively determined in a same manner.

Figure 5:
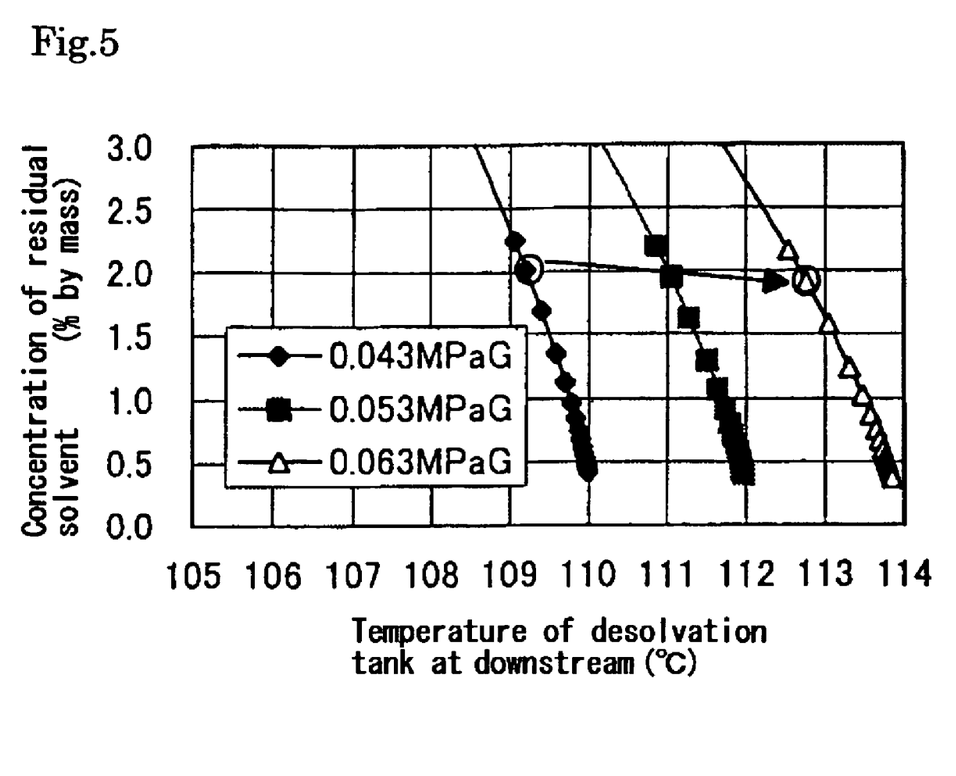
FIG. 5 is a graph showing a correlation between temperature and pressure in the desolvation tank at the downstream, and concentration of the residual solvent, when only pressure in the desolvation tank at the downstream is raised.

As a result, as the mass ratio of steam against the solvent became larger, or, as the pressure of the tank became larger even if the mass ratio thereof was same, the temperature became higher, being the same as described (1) above. On the other hand, it was found that, there was a tendency in that concentration of the residual solvent became lower as the pressure became higher, as shown for example the case in which the mass ratio of steam against the solvent is 0.40 by arrow mark in FIG. 5.

[2] Desolvation Experiment

An apparatus in which two desolvation tanks are connected to each other in series by a pipe for transferring solvent-containing polymer and a pipe for transferring solvent-containing steam and a pressure adjusting valve is fixed at the pipe for transferring solvent-containing steam was used. Based on such finding according to [1] described above, the desolvation efficiency was studied by raising only the pressure of the desolvation tank at the downstream.

(1) Apparatus

Figure 6:
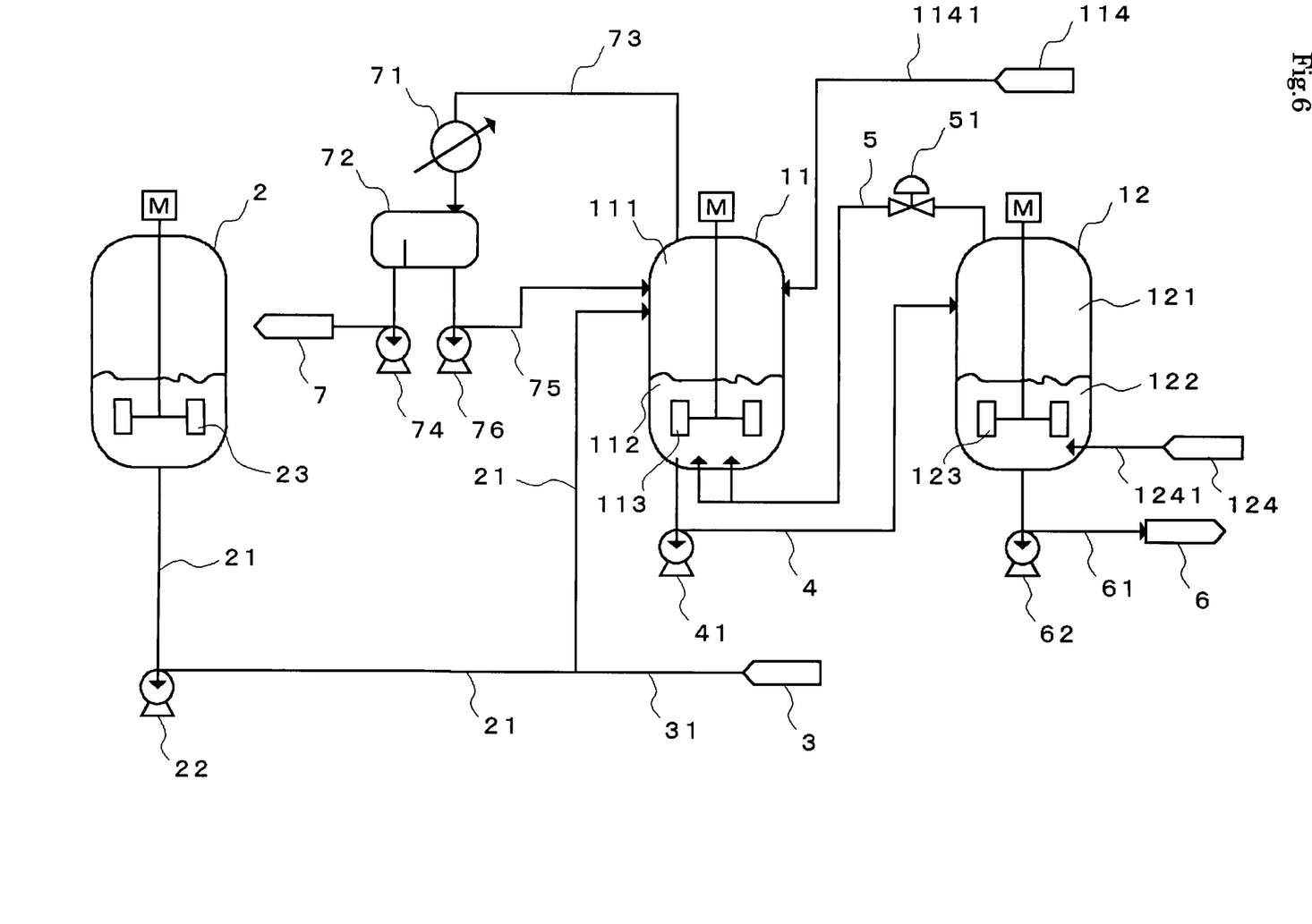
FIG. 6 is a schematic view of an apparatus used for evaluation of desolvation.

This apparatus, as shown in FIG. 6, comprises a desolvation tank 11 at the upstream (made of stainless steel, inner volume; 2.5 m$^3$), a desolvation tank 12 at the downstream (made of stainless steel, inner volume; 2.5 m$^3$), a polymer tank 2 for storing a polymer solution (made of stainless steel, inner volume; 5 m$^3$), a pipe 21 for charging a polymer solution, having an inner diameter of 1 inch, where one end side thereof opens to a gas phase portion 111 of the desolvation tank 11 at the upstream and another end side thereof is connected to the polymer tank 2, a steam supply source 3 for the polymer solution, a pipe for supplying steam 31 for the polymer solution, having an inner diameter of ¾ inch, where one end side thereof opens to the pipe 21 for charging the polymer solution and another end side thereof is connected to the steam supply source 3 for the polymer solution, a pipe 4 for transferring solvent-containing polymer, having an inner diameter of 1 inch, where one end side thereof opens to a liquid phase portion 112 of the desolvation tank 11 at the upstream and another end side thereof opens to a gas phase portion 121 of the desolvation tank 12 at the downstream, a steam supply source 124 at the downstream, a pipe 1241 for supplying steam at the downstream, having an inner diameter of ¾ inch, where one end thereof opens to a liquid phase portion 122 of the desolvation tank 12 at the downstream and another end thereof is connected to the steam supply source 124 at the downstream, a pipe 5 for transferring the solvent-containing steam, having an inner diameter of 3 inches, where one end thereof opens to the gas phase portion 121 of the desolvation tank 12 at the downstream and another end thereof opens to the liquid phase portion 112 of the desolvation tank 11 at the upstream, a pressure adjusting valve 51 fixed to the pipe 5 for transferring the solvent-containing steam, a polymer recovery step comprising a polymer recovery apparatus 6, a pipe 61 for transferring a recovered polymer, having an inner diameter of 1 inch, where one end thereof opens to a liquid phase portion 122 of the desolvation tank 12 at the downstream and another one end thereof is connected to the polymer recovery step, the solvent recovery step comprising a solvent recovery apparatus 7, and a pipe 73 for transferring a steam-containing solvent, having an inner diameter of 3 inches, where one end thereof opens to the gas phase portion 111 of the desolvation tank 11 at the upstream and another end thereof is connected to the polymer recovery step.

Figure 7:
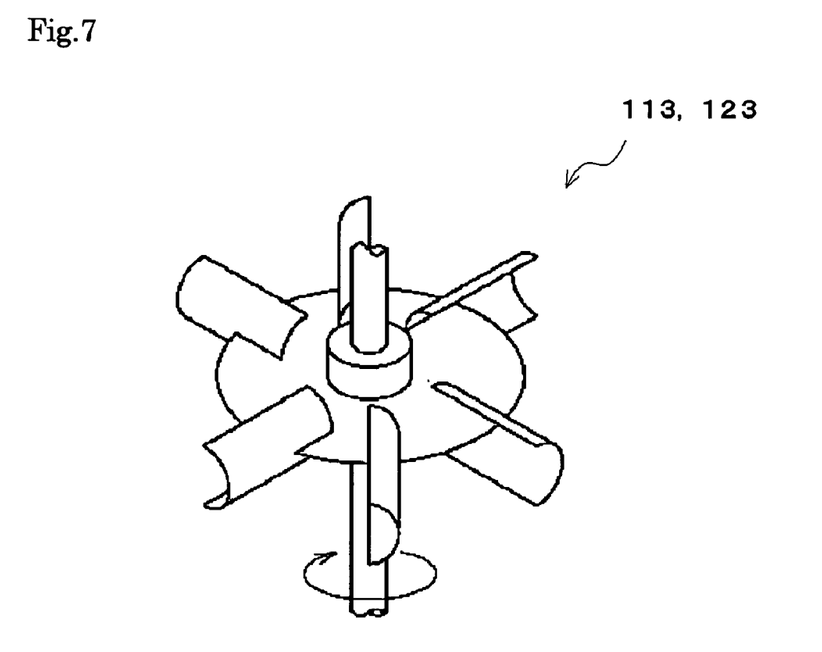
FIG. 7 is a perspective view of a concave type stirring blade disposed in the desolvation tank.

Additionally, concave type stirring blades 113 and 123, as shown in FIG. 7, are attached to the desolvation tank at the upstream 11 and the desolvation tank at the downstream 12, respectively. Since these concave type stirring blade were used, each liquid phase portion was stirred sufficiently and desolvation was performed more efficiently.

Incidentally, a pitched disk turbine type of stirring blade 23 is attached to the polymer tank 2.

(2) Desolvation Method

A solution in which 6.5% by mass of ethylene•propylene•ethylidene norbornene copolymer rubber was dissolved in n-hexane was used as the polymer solution. Further, as for steam, one having a pressure of 0.3 MPaG and a temperature of 143° C. was used. In addition, the desolvation was performed under the conditions of the amount of polymer solution to be delivered of 100 kg/hour; the amount of steam to be supplied to the polymer solution which is transferred inside a pipe for charging polymer solution of 2 kg/hour; and the amount of steam to be supplied to the desolvation tank at the downstream of 31 kg/hour.

Further, a mass ratio of a sum of the steam at the upstream and at the downstream to the solvent comes to be 0.35.

The polymer solution was stored in the polymer tank 2 having a stirring blade. And then the polymer solution was delivered from the polymer tank 2 using a gear pump 22, metered by a flow-meter and transferred inside a pipe 21 for charging polymer solution. A predetermined amount of steam was flashed from a steam supply pipe 31 for polymer solution to this polymer solution, and was further transferred inside the pipe 21 for charging polymer solution to introduce to the gas phase portion 111 of the desolvation tank 11 at the upstream. At this time, a vaporized solvent was separated from the polymer therein, to thereby perform the desolvation. The separated solvent was recovered from a top portion of the desolvation tank 11, was cooled to be liquefied by a cooler 71. Subsequently, the resultant liquid was transferred to a decanter 72 and solvent and water are separated from each other. The solvent was purified in a solvent recovery apparatus 7 and was recovered.

On the other hand, the solvent-containing polymer in which a small amount of solvent remains was dropped in the liquid phase portion 112 of the desolvation tank 11 at the upstream. And then, this solvent-containing polymer was transferred through the pipe 4 for transferring the solvent-containing polymer and was charged in the gas phase portion 121 of the desolvation tank 12 at the downstream. After that, the solvent-containing polymer was dropped in the liquid phase portion 122 and was further subjected to desolvation by steam stripping with steam supplied from the pipe 1241 for supplying steam at the downstream. Subsequently, the polymer having a trace amount of solvent remained was taken out from the liquid phase portion 122 of the desolvation tank 12 at the downstream to transfer through the pipe 61 for transferring recovered polymer. The resultant polymer was dried in the polymer recovery apparatus 6 and was recovered. In addition, the solvent separated in the desolvation tank at the downstream was transferred to the liquid phase portion 112 of the desolvation tank 11 at the upstream through the pipe 5 for transferring solvent-containing steam and was recovered together with the solvent which was separated in this liquid phase portion 112.

Comparative Example 1

In the desolvation operation described above, desolvation was performed without operating the pressure adjusting valve 51 fixed to the pipe 5 for transferring the solvent-containing steam, namely, without controlling the pressure of the desolvation tank 12 at the downstream. The pressure of the desolvation tank 12 at the downstream in this time was 0.070 MPaG, the pressure of the desolvation tank 11 at the upstream was 0.056 MPaG and the pressure difference ΔP was 0.014 MPa. (This is a sum of 0.013 MPa which was a pressure corresponding to a submerged water level in the desolvation tank at the upstream and 0.001 MPa which was a pressure loss of the pipe 4 for transferring the solvent-containing polymer and the pipe 5 for transferring the solvent-containing steam.) Further, the temperature was 117° C. While performing the desolvation in such a manner, the solvent-containing polymer before charging from the pipe 4 for transferring the solvent-containing polymer into the gas phase portion 121 of the desolvation tank 12 was taken as a sample to determine the residual solvent quantitatively and it was found that the concentration of the residual solvent was 6.28% by mass. After that, a sample was taken from the pipe 61 for transferring the recovered polymer in the vicinity of the outlet of the desolvation tank 12 at the downstream and the residual solvent in the polymer was subjected to a quantitative determination. It was found that the concentration of the residual solvent was 0.88% by mass.

Such quantitative determination of the residual solvent was performed by using a gas chromatographic apparatus attached with an FID as a detector in a same manner described above.

Example 1

In the desolvation operation described above, the pressure adjusting valve 51 fixed to the pipe 5 for transferring the solvent-containing steam was throttled to raise the pressure of the desolvation tank 12 at the downstream from 0.070 MPaG to 0.095 MPaG. According to this operation, the temperature of the desolvation tank at the downstream was elevated from 117° C. to 120° C. And the pressure of the desolvation tank 11 at the upstream in this time was 0.056 MPaG, the pressure difference ΔP became larger from 0.014 MPa to 0.039 MPa and ΔP−ΔP$_0$ was 0.025 MPa. In this way, the pressure was controlled such that a pressure difference between the desolvation tank 12 at the downstream and the desolvation tank 11 at the upstream is allowed to be larger than a pressure difference under the operational condition in which the opening-degree adjusting mean is fully opened. After that, the residual solvent in the solvent-containing polymer which was charged into the gas phase portion 121 of the desolvation tank 12 at the downstream was quantitatively determined in the same manner as in Comparative Example 1 and it was found that the concentration of the residual solvent was 6.03% by mass. In addition, a sample was taken in the vicinity of the outlet of the desolvation tank 12 at the downstream in a similar manner, and the residual solvent was determined at 0.48% by mass.

Example 2

The pressure of the desolvation tank 12 at the downstream was controlled to 0.110 MPaG. Thereby, the pressure difference ΔP with the desolvation tank 11 at the upstream and ΔP−ΔP$_0$ became larger as 0.054 MPa and 0.040 MPa, respectively, and the temperature became 122° C. And desolvation was performed in a same manner as in Example 1. Thereafter, the residual solvent in the solvent-containing polymer which was charged into the gas phase portion 121 of the desolvation tank 12 at the downstream was quantitatively determined in the same manner as in Example 1 and it was found that the concentration of the residual solvent was 5.97% by mass. Further, a sample was taken in the vicinity of the outlet of the desolvation tank 12 at the downstream in a similar manner, and the residual solvent was determined at 0.50% by mass.

Example 3

The pressure of the desolvation tank 12 at the downstream was controlled to 0.210 MPaG. Thereby, the pressure difference ΔP with the desolvation tank 11 at the upstream and ΔP−ΔP$_0$ became larger as 0.154 MPa and 0.140 MPa, respectively, and the temperature became 135° C. And desolvation was performed in a same manner as in Example 1. Thereafter, the residual solvent in the solvent-containing polymer which was charged into the gas phase portion 121 of the desolvation tank 12 at the downstream was quantitatively determined in the same manner as in Example 1 and it was found that the concentration of the residual solvent was 5.99% by mass. Further, a sample was taken in the vicinity of the outlet of the desolvation tank 12 at the downstream in a similar manner, and the residual solvent was determined at 0.25% by mass.

The results of Comparative Example 1 and Examples 1 to 3 are shown in Table 1.

TABLE 1

|  | $P_1$ (MPaG) | $P_2$ (MPaG) | ΔP (MPa) | ΔP − ΔP$_0$ (MPa) | Residual solvent concentration (mass %) |
|---|---|---|---|---|---|
| Comparative Example 1 | 0.056 | 0.07 | 0.014 | — | 0.88 |
| Example 1 | 0.056 | 0.095 | 0.039 | 0.025 | 0.48 |
| 2 | 0.056 | 0.11 | 0.054 | 0.04 | 0.50 |
| 3 | 0.056 | 0.21 | 0.154 | 0.140 | 0.25 |

Figure 8:
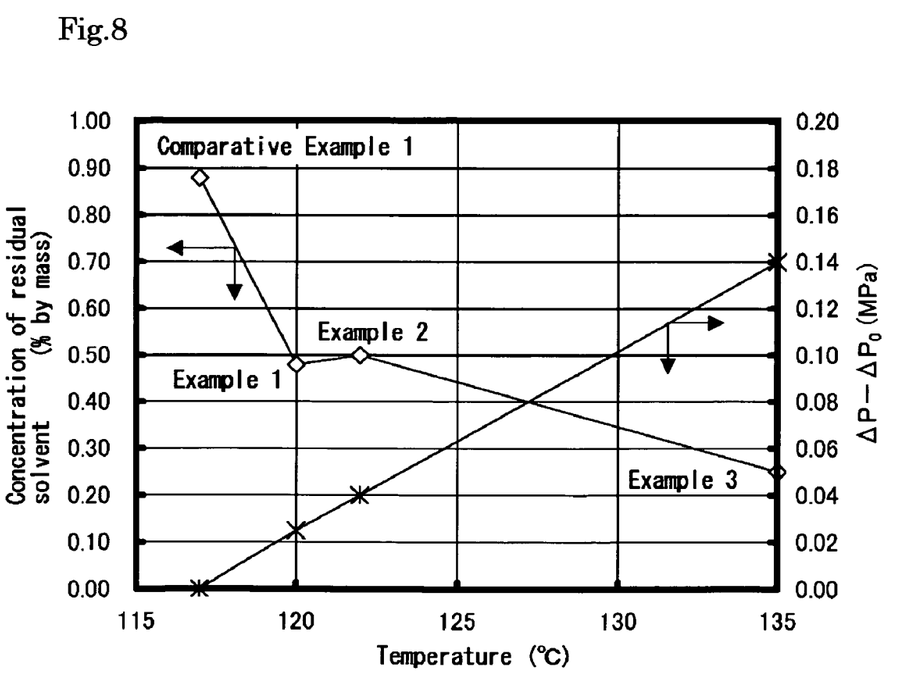
FIG. 8 is a graph showing a correlation between $\Delta P-\Delta P_0$ and temperature, and a correlation between temperature and concentration of the residual solvent.
Figure 9:
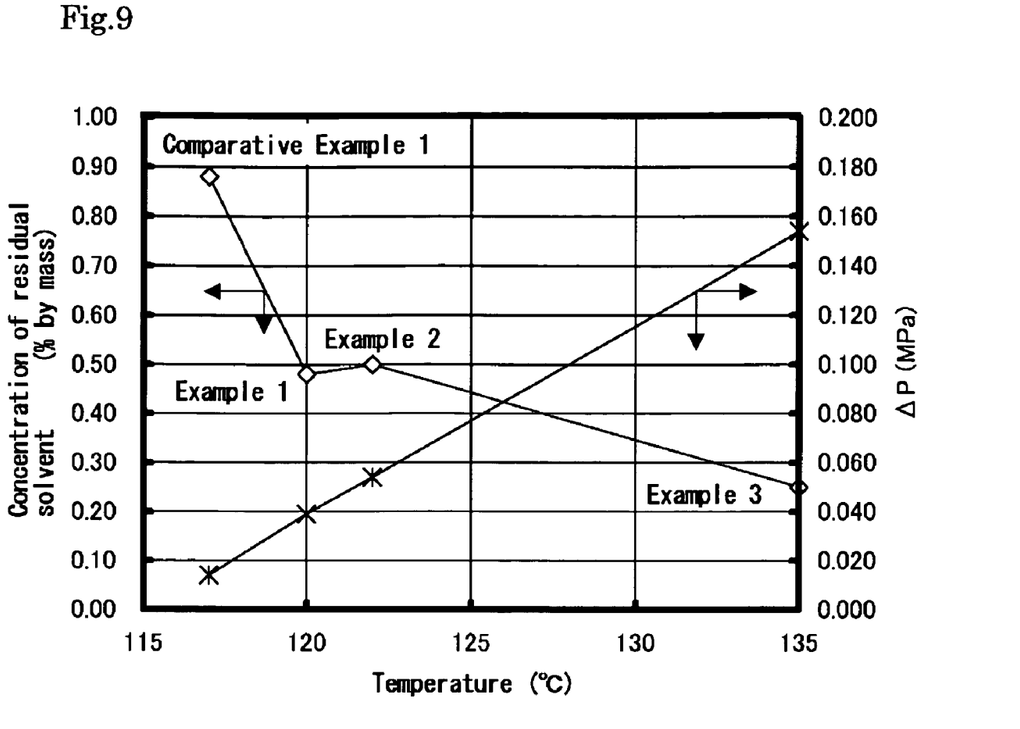
FIG. 9 is a graph showing a correlation between ΔP and temperature, and a correlation between temperature and concentration of the residual solvent.

As is found from Table 1 and FIG. 8 showing a correlation between ΔP−ΔP$_0$ and temperature and a correlation between temperature and concentration of the residual solvent, when pressures were controlled such that the pressure difference between the desolvation tank at the downstream and the desolvation tank at the upstream was allowed to be larger than a pressure difference under the operational condition in which the opening-degree adjusting mean was fully opened, the temperature came to be high and the concentration of the residual solvent was decreased. In addition, as is also found from FIG. 9 showing a correlation between ΔP and temperature, and a correlation between temperature and concentration of the residual solvent, it is found that the concentration of the residual solvent was decreased by controlling the pressure. Particularly, in the case the pressures, ΔP and ΔP−ΔP$_0$ were as large as 0.210 MPaG, 0.154 MPa and 0.140 MPa, respectively, the concentration of the residual solvent was reduced remarkably to 0.25% by mass.

The present invention is not limited to the description of Examples mentioned above and various modifications can be made within the scope of the present invention depending on purposes, applications and the like. For example, as for the stirring blade to be attached to the desolvation tank, a disk turbine blade, a slant paddle and the like can be used. In addition, as for a metering pump, a plunger pump, a diaphragm pump and the like can also be used. Still further, a gas-liquid mixing apparatus is disposed at a joint between the pipe for charging the polymer solution and the pipe for supplying steam for the polymer solution and then, the polymer solution and steam are allowed to be in contact with each other in this gas-liquid mixing apparatus to thereby enhance efficiency of the desolvation.

Additionally, an opening part of a pipe which supplies steam into a desolvation tank or of a pipe which transfers solvent-containing steam may have a structure which is capable of supplying steam and the like at a higher speed. For example, a tip of the pipe may be a structure in which a plurality of pores each having a smaller diameter than that of the pipe are arranged in annular. In this case, a jig comprising an opening part having such structure may be fixed at the side of the tip of the pipe. Further, a structure in which a plurality of capillaries each having a smaller diameter than that of the pipe are opened in a same direction along the circumferential direction of the desolvation tank can be taken. In this case, a jig comprising an opening part having such structure may also be fixed at the side of the tip of the pipe.

The invention claimed is:

1. A method of desolvating a polymer solution, comprising:
   (a) steam stripping solvent from a polymer solution in an upstream desolvation tank;
   (b) steam stripping solvent from the polymer solution in a downstream desolvation tank
   wherein
   the upstream desolvation tank has a liquid phase portion and a gas phase portion,
   downstream desolvation tank has a liquid phase portion and a gas phase portion,
   the liquid phase portion of the upstream desolvation tank and the gas phase portion of the downstream desolvation tank are connected by a pipe, and
   at least one opening-degree adjusting mean is fixed to the pipe; and
   (c) controlling pressures such that a pressure difference (ΔP=P2−P1) between pressure (P2) of the gas phase portion of the downstream desolvation tank and pressure (P1) of the gas phase portion of the upstream desolvation tank is larger by from 0.005 to 0.6 MPa than a pressure difference ($\Delta P0 = P20-P10$) between pressure (P20) of the gas phase portion of the downstream desolvation tank and a pressure (P10) of the gas phase portion of the upstream desolvation tank when the opening-degree adjusting mean is fully opened.

2. The method of claim 1, wherein the pressure of the gas phase portion of the downstream desolvation tank is in the range from 0.02 to 1 MPaG.

3. The method of claim 2, wherein the temperature of the liquid phase portion of the downstream desolvation tank is in the range from 100° C. to 200° C.

4. The method of claim 3, wherein the solvent comprises at least one member selected from the group consisting of cyclohexane, cyclopentane, cycloheptane, toluene, benzene, xylene, n-hexane, n-pentane, isopentane, n-heptane, n-octane, n-decane and dichloromethane.

5. The method of claim 4, wherein the polymer contained in the polymer solution is butadiene rubber, isoprene rubber, styrene-butadiene rubber, styrene• isoprene rubber, ethylene• α-olefin copolymer rubber, ethylene• α-olefin• non-conjugated diene copolymer rubber, butyl rubber, styrene• butadiene• styrene block copolymer, hydrogenated styrene• butadiene• styrene block copolymer, butadiene resin or acrylic resin.

6. The method of claim 1, wherein the temperature of the liquid phase portion of the downstream desolvation tank is in the range from 100° C. to 200° C.

7. The method of claim 1, wherein the opening-degree adjusting mean is a pressure adjusting valve or an orifice plate.

8. The method of claim 1, wherein the concentration of the solvent remaining in a solvent-containing polymer to be loaded in the downstream desolvation tank is 10% by mass or less.

9. The method of claim 1, wherein the polymer solution is continuously supplied and polymer contained in the polymer solution is continuously recovered.

10. The method of claim 1, wherein the polymer contained in the polymer solution is butadiene rubber, isoprene rubber, styrene-butadiene rubber, styrene• isoprene rubber, ethylene• α-olefin copolymer rubber, ethylene• α-olefin• non-conjugated diene copolymer rubber, butyl rubber, styrene• butadiene• styrene block copolymer, hydrogenated styrene• butadiene• styrene block copolymer, butadiene resin or acrylic resin.

11. The method of claim 1, wherein the solvent is at least one member selected from the group consisting of cyclohexane, cyclopentane, cycloheptane, toluene, benzene, xylene, n-hexane, n-pentane, isopentane, n-heptane, n-octane, n-decane and dichloromethane.

12. A method of desolvating a polymer solution, comprising:
(a) steam stripping solvent from a polymer solution in an upstream desolvation tank;
(b) steam stripping solvent from the polymer solution in a downstream desolvation tank
wherein
  the upstream desolvation tank has a liquid phase portion and a gas phase portion,
  downstream desolvation tank has a liquid phase portion and a gas phase portion,
  the liquid phase portion of the upstream desolvation tank and the gas phase portion of the downstream desolvation tank are connected by a pipe, and
  at least one opening-degree adjusting mean is fixed to the pipe; and
(c) controlling pressures such that a pressure difference ($\Delta P = P2-P1$) between pressure (P2) of the gas phase portion of the downstream desolvation tank and pressure (P1) of the gas phase portion of the upstream desolvation tank is 0.036 MPa or larger.

13. The method of claim 12, wherein the pressure of the gas phase portion of the downstream desolvation tank is in the range from 0.02 to 1 MPaG.

14. The method of claim 13, wherein the temperature of the liquid phase portion of the downstream desolvation tank is in the range from 100° C. to 200° C.

15. The method of claim 14, wherein the solvent is at least one member selected from the group consisting of cyclohexane, cyclopentane, cycloheptane, toluene, benzene, xylene, n-hexane, n-pentane, isopentane, n-heptane, n-octane, n-decane and dichloromethane.

16. The method of claim 15, wherein the polymer contained in the polymer solution is butadiene rubber, isoprene rubber, styrene-butadiene rubber, styrene• isoprene rubber, ethylene• α-olefin copolymer rubber, ethylene• α-olefin• non-conjugated diene copolymer rubber, butyl rubber, styrene• butadiene• styrene block copolymer, hydrogenated styrene• butadiene• styrene block copolymer, butadiene resin or acrylic resin.

17. The method of claim 12, wherein the temperature of the liquid phase portion of the downstream desolvation tank is in the range from 100° C. to 200° C.

18. The method of claim 12, wherein the opening-degree adjusting mean is a pressure adjusting valve or an orifice plate.

19. The method of claim 12, wherein the concentration of the solvent remaining in a solvent-containing polymer to be loaded in the downstream desolvation tank is 10% by mass or less.

20. The method of claim 12, wherein the polymer solution is continuously supplied and polymer contained in the polymer solution is continuously recovered.

21. The method of claim 12, wherein polymer contained in said polymer solution is butadiene rubber, isoprene rubber, styrene-butadiene rubber, styrene•isoprene rubber, ethylene•α-olefin copolymer rubber, ethylene•α-olefin•non-conjugated diene copolymer rubber, butyl rubber, styrene•butadiene•styrene block copolymer, hydrogenated styrene•butadiene• styrene block copolymer, butadiene resin or acrylic resin.

22. The method of claim 12, wherein the solvent is at least one member selected from the group consisting of cyclohexane, cyclopentane, cycloheptane, toluene, benzene, xylene, n-hexane, n-pentane, isopentane, n-heptane, n-octane, n-decane and dichloromethane.

* * * * *